US011920756B2

(12) United States Patent
Ye et al.

(10) Patent No.: US 11,920,756 B2
(45) Date of Patent: Mar. 5, 2024

(54) LIGHT SHIELDING COMPONENT, AND CORRESPONDING OPTICAL ASSEMBLY, VEHICLE LAMP AND VEHICLE

(71) Applicant: VALEO VISION, Bobigny (FR)

(72) Inventors: Shifeng Ye, Hubei (CN); Shuxiong Zhou, Hubei (CN); Fei Xiong, Hubei (CN); Mingrui Sun, Hubei (CN)

(73) Assignee: Valeo Vision, Bobigny (FR)

( * ) Notice: Subject to any disclaimer, the term of this patent is extended or adjusted under 35 U.S.C. 154(b) by 15 days.

(21) Appl. No.: 17/609,606

(22) PCT Filed: May 28, 2020

(86) PCT No.: PCT/EP2020/064908
§ 371 (c)(1),
(2) Date: Nov. 8, 2021

(87) PCT Pub. No.: WO2020/239946
PCT Pub. Date: Dec. 3, 2020

(65) Prior Publication Data

US 2022/0221125 A1 Jul. 14, 2022

(30) Foreign Application Priority Data

May 30, 2019 (CN) ........................ 201920809004.2

(51) Int. Cl.
*F21S 43/237* (2018.01)
*F21S 43/27* (2018.01)
*F21S 43/50* (2018.01)

(52) U.S. Cl.
CPC ............ *F21S 43/237* (2018.01); *F21S 43/27* (2018.01); *F21S 43/51* (2018.01)

(58) Field of Classification Search
CPC ........... F21S 43/237; F21S 43/27; F21S 43/51
See application file for complete search history.

(56) References Cited

U.S. PATENT DOCUMENTS

2017/0153001 A1 6/2017 Herbin
2019/0309923 A1 * 10/2019 Schall .................. G02B 6/0006
2019/0366919 A1 12/2019 Wimmer et al.

FOREIGN PATENT DOCUMENTS

DE 102007010023 A1 9/2007
DE 202017100874 U1 6/2018

(Continued)

OTHER PUBLICATIONS

European Patent Office, International Search Report and Written Opinion of corresponding International Application No. PCT/EP2020/064908, dated Jul. 29, 2020.

*Primary Examiner* — Thomas M Sember
(74) *Attorney, Agent, or Firm* — Valeo Vision

(57) ABSTRACT

One of the problems solved by an embodiment of the present invention is to solve the problem of light leakage. A light shielding component according to the present invention comprising a covering portion, and a snap-fit portion, wherein the covering portion is used to cover a light guide to block the transmission of light rays; and the snap-fit portion comprises at least one slot, which is used to fix the light shielding component. Compared with the prior art, the advantage of the solution of the present invention is that by using a light shielding component, the light beam leakage is better blocked, and a better visual effect is achieved.

12 Claims, 8 Drawing Sheets

(56) References Cited

FOREIGN PATENT DOCUMENTS

| | | | |
|---|---|---|---|
| EP | 2775197 | A1 | 9/2014 |
| EP | 2811219 | A1 | 12/2014 |
| EP | 3173682 | A1 | 5/2017 |
| JP | 2017185972 | A | 10/2017 |
| KR | 20150004646 | U | 12/2015 |

* cited by examiner

LIGHT SHIELDING COMPONENT, AND CORRESPONDING OPTICAL ASSEMBLY, VEHICLE LAMP AND VEHICLE

CROSS-REFERENCE TO RELATED APPLICATIONS

This is a 371 application (submitted under 35 U.S.C. § 371) of International Application No. PCT/EP2020/064908 (WO2020239946) filed on May 28, 2020, which claims priority date benefit to Chinese Application No. 201920809004.2 filed May 30, 2019, the disclosures of which are incorporated herein by reference in their entirety.

TECHNICAL FIELD

The present invention relates to the technical field of lighting, and in particular to a light shielding component, and a corresponding optical assembly, vehicle lamp and vehicle.

BACKGROUND

Light guides are widely used in various types of vehicle lamps. Generally, the light guide is installed into the vehicle lamp via a supporting member, but if the light guide is left untreated, light will often leak out at an end of the light guide, affecting the overall visual effect.

SUMMARY

In view of this, one of the problems solved by an embodiment of the present invention is to solve the problem of light leakage at an end.

According to an aspect of the present invention, a light shielding component is provided, wherein the light shielding component includes a covering portion, and a snap-fit portion, wherein the covering portion is used to cover a light guide to block the transmission of light rays, and the snap-fit portion comprises at least one slot, which is used to fix the light shielding component.

According to the solution of the present invention, the light shielding component can be fixed on a supporting member of the light guide to shield light rays, thereby solving the problem of light leakage.

In the light shielding component according to the present invention, the snap-fit portion is located on two sides of the covering portion.

According to the solution of the present invention, the light shielding component can be better fixed by means of the snap-fit portion.

In the light shielding component according to the present invention, the snap-fit portion comprises a slot and a snap joint.

By using a slot and a snap joint, the connection between the light shielding component according to the present invention and the supporting portion is firmer.

In the light shielding component according to the present invention, the snap-fit portion comprises two slots and two snap joints, wherein the two slots are close to a start position of the covering portion, and the two snap joints are close to an end position of the covering portion.

By using multiple slots and snap joints, the connection is firmer.

According to another aspect of the present invention, there is further provided an optical assembly, wherein the optical assembly comprises the light shielding component, a light guide, and a supporting portion, wherein the supporting portion is provided with a matching portion corresponding to a snap-fit portion of the light shielding component.

The problem of light leakage of the light guide can be better solved by the optical assembly according to the present invention.

In the optical assembly according to the present invention, the snap-fit portion comprises a slot and a snap joint, the matching portion is provided with a protrusion matching the slot, and an extension matching the snap joint; the slot is used to accommodate the protrusion; and the snap joint is used to retain the extension.

Through the cooperation of the snap-fit portion and its matching portion, a firm and stable connection between the light shielding component and the supporting portion can be achieved in the optical assembly according to the present invention.

In the optical assembly according to the present invention, the supporting portion comprises an accommodation portion for accommodating the light guide.

By using a supporting portion with an accommodation portion, it is ensured that the light guide is not displaced and is more stable.

In the optical assembly according to the present invention, a main body of the light guide is in the shape of a long strip, the accommodation portion comprises an arc-shaped groove, and the covering portion comprises an arc-shaped groove matching the light guide in shape.

In the optical assembly according to the present invention, the matching portion comprises two protrusions and two extensions, wherein the two protrusions are located on two sides of the main body of the light guide, and the two extensions are located on two sides of an end of the light guide.

In the optical assembly according to the present invention, the optical assembly further comprises a light source.

According to another aspect of the present invention, there is further provided a vehicle lamp comprising the optical assembly.

According to another aspect of the present invention, there is further provided a vehicle comprising the vehicle lamp.

Compared with the prior art, the advantage of the solution of the present invention is that by using a light shielding component, the light beam leakage is better blocked, and a better visual effect is achieved.

BRIEF DESCRIPTION OF THE DRAWINGS

Other features, objects and advantages of the present invention will become more obvious through perusal of a detailed description of non-limiting embodiments which makes reference to the accompanying drawings below.

LIST OF REFERENCE SIGNS

Figure 1:
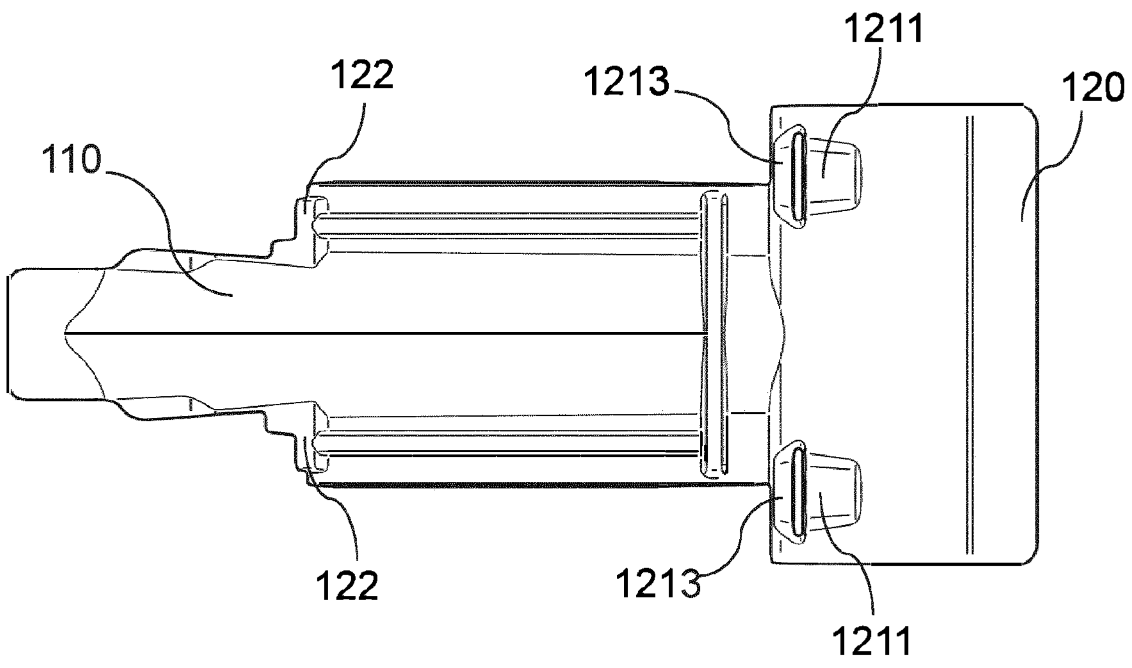
FIG. 1 shows a schematic front view of a light shielding component according to an embodiment of the present invention.

| | | | |
|---|---|---|---|
| 100 | Light shielding component | 200 | Light guide |
| 300 | Supporting portion | 400 | Light source |
| 110 | Covering portion | 120 | Snap-fit portion |
| 121 | Slot | 122 | Snap joint |
| 1211 | Upper stop | 1212 | Opening |
| 1213 | Elastic member | 123 | Contact portion |
| 310 | Matching portion | 311 | Protrusion |
| 312 | Extension | 320 | Accommodation portion |
| 210 | Main body | 220 | Rear portion |

DETAILED DESCRIPTION

Preferred embodiments of the present invention are described in greater detail below with reference to the accompanying drawings. Although preferred embodiments of the present invention are shown in the drawings, it should be understood that the present invention may be realized in various forms, and should not be restricted by the embodiments expounded here. On the contrary, these embodiments are provided in order to make the present invention more thorough and complete, and to enable the scope of the present invention to be conveyed to those skilled in the art in a complete fashion.

According to an embodiment of the present invention, a light shielding structure 100, and a corresponding optical structure, vehicle lamp and vehicle are disclosed.

Figure 3:
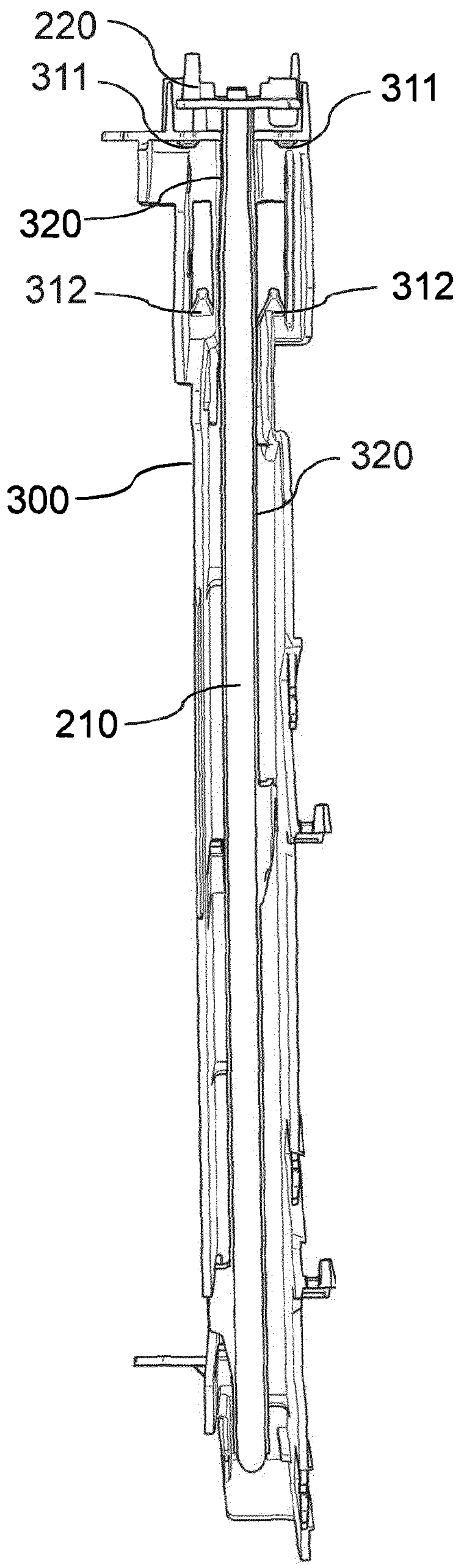
FIG. 3 shows a structural schematic view of a light guide and its supporting portion according to an embodiment of the present invention.
Figure 4:
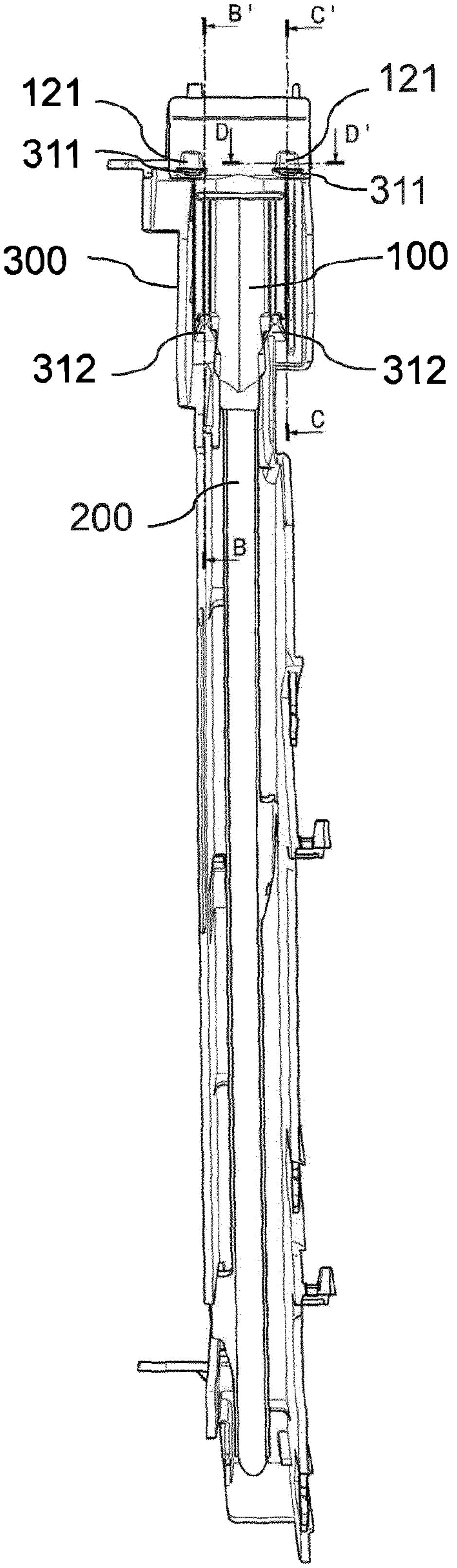
FIG. 4 shows a structural schematic view of an optical structure according to an embodiment of the present invention.
Figure 5:
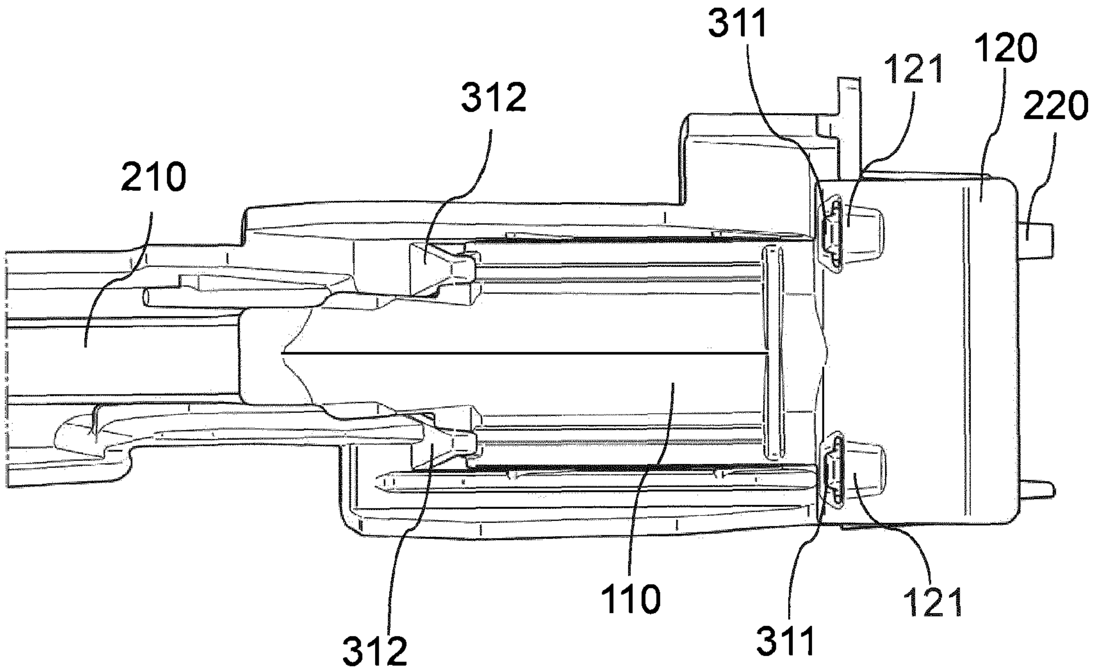
FIG. 5 shows a partially enlarged, structural schematic view of an optical structure according to an embodiment of the present invention.
Figure 6:
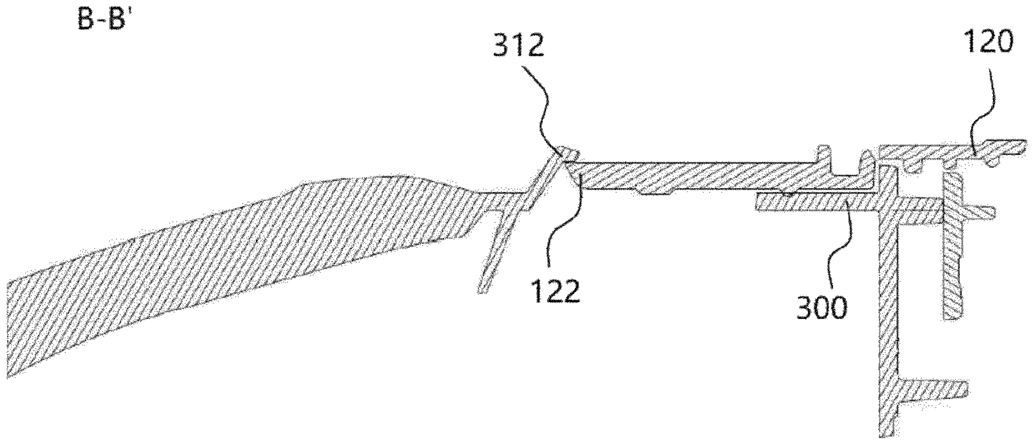
FIG. 6 shows a cross-sectional view of the optical structure shown in FIG. 4 or 5 along a line BB'.
Figure 7:
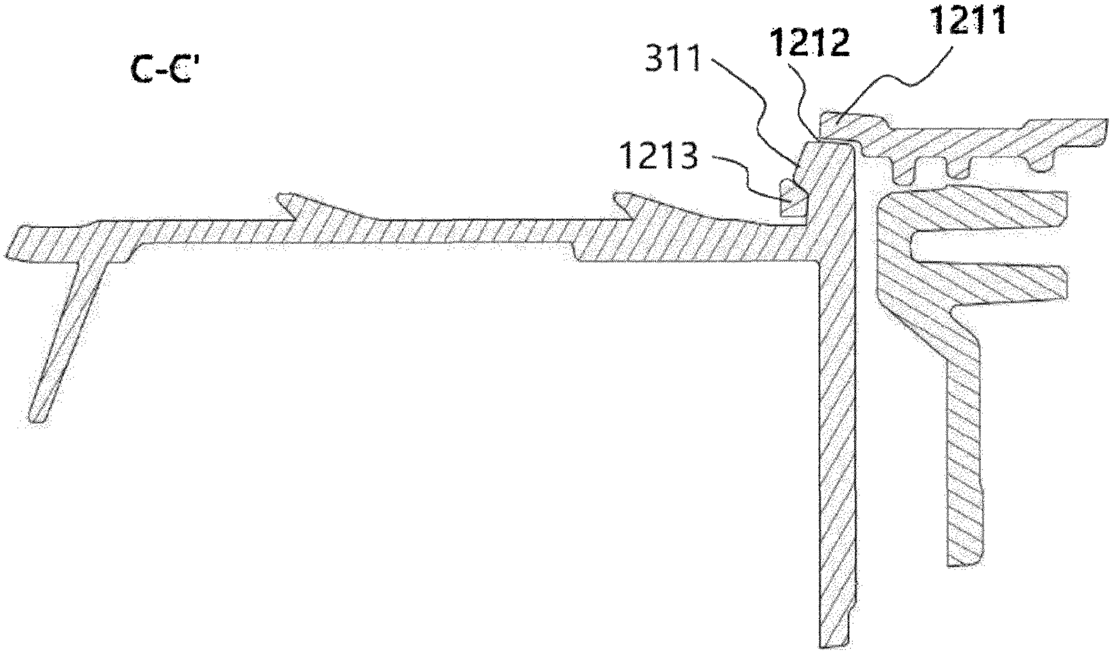
FIG. 7 shows a cross-sectional view of the optical structure shown in FIG. 4 or 5 along a line CC'.
Figure 8:
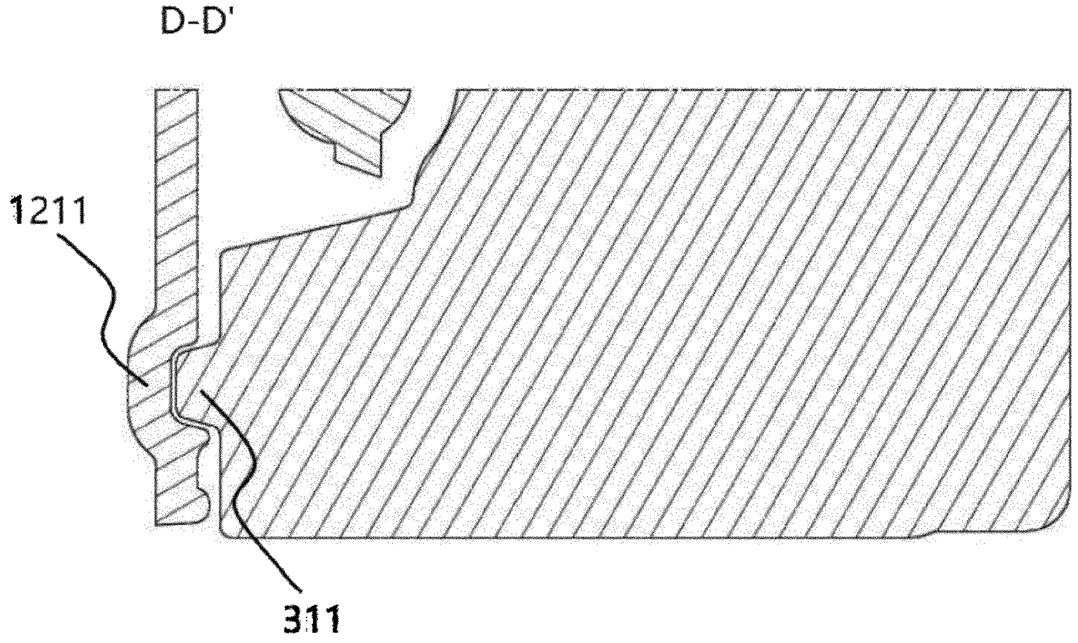
FIG. 8 shows a cross-sectional view of the optical structure shown in FIG. 4 or 5 along a line DD'.

Referring to FIGS. 3 to 5, the optical structure according to the present invention comprises a light shielding component 100, a light guide 200, and a supporting portion 300, wherein the supporting portion 300 is provided with a matching portion 310 corresponding to a snap-fit portion 120 of the light shielding component 100.

Preferably, the optical structure according to the present invention further comprises a light source 400.

The light source 400 is located at an opening end of the light guide 200, and the light shielding component 100 is located at an end of the light guide 200.

According to the optical structure of the present invention, the supporting portion 300 is used to support the light guide 200 and the light shielding component 100.

Figure 2:
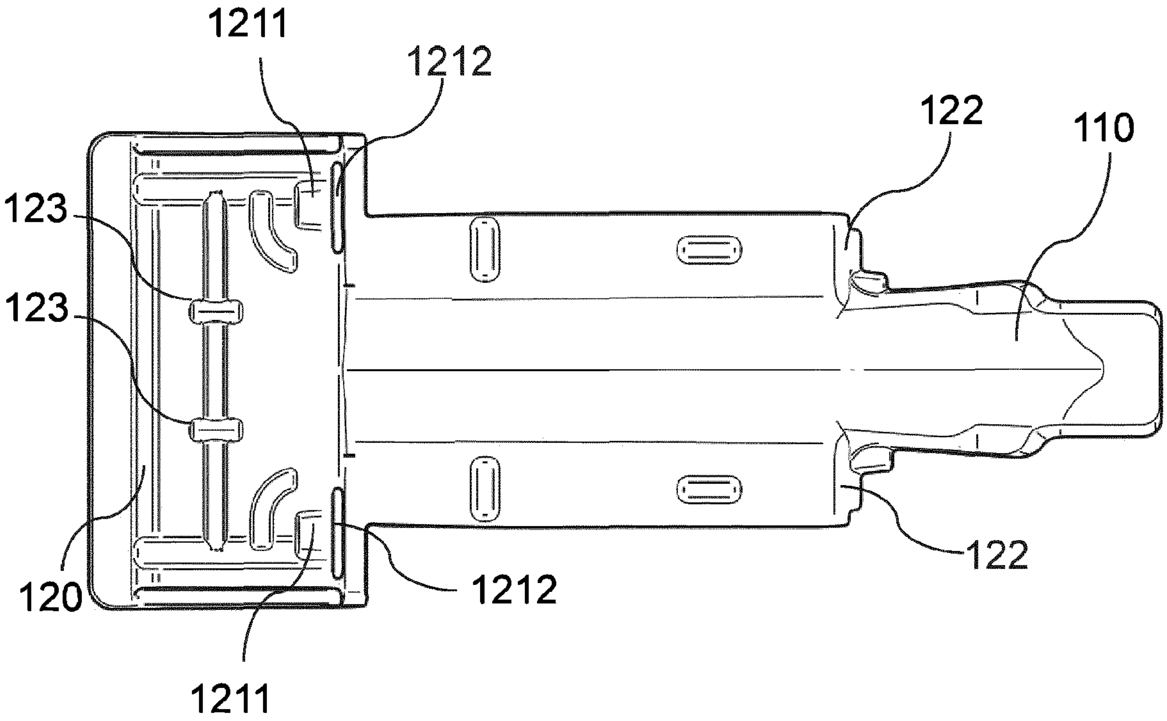
FIG. 2 shows a schematic rear view of a light shielding component according to an embodiment of the present invention.

Referring to FIGS. 1 and 2, the light shielding component 100 comprises a covering portion 110 and the snap-fit portion 120, wherein the covering portion 110 is used to cover the light guide 200 to block the transmission of light rays, and the snap-fit portion 120 is used to fix the light shielding component 100.

Specifically, the light shielding component 100 is located at the end of the light guide 200, covers the light guide 200 via the covering portion 110, and is connected to the supporting portion 300 via the snap-fit portion 120.

Specifically, the supporting portion 300 comprises an accommodation portion 320 for accommodating the light guide 200. More preferably, a main body 210 of the light guide 200 is in the shape of a long strip, the accommodation portion 320 is an arc-shaped groove, and the covering portion 110 comprises an arc-shaped groove matching the light guide 200 in shape.

The snap-fit portion 120 is used to connect the light shielding component 100 to the supporting portion 300. The snap-fit portion 120 may be implemented by various forms of connection structures. More preferably, the snap-fit portion 120 may further comprise a plurality of connection components, and each connection component can have a different type.

According to a preferred embodiment, the snap-fit portion 120 is located on two sides of the covering portion 110.

According to an embodiment of the present invention, the snap-fit portion 120 according to the present invention comprises a slot 121, and the matching portion 310 according to the present invention is provided with a protrusion 311 matching the slot 121.

Referring to FIGS. 5 to 8, the slot 121 is provided with an upper stop 1211, an opening 1212, and an elastic member 1213. When connecting to the supporting portion 300, the protrusion 311 of the supporting portion 300 passes through the opening 1212, the slight deformation of the elastic member 1213 enables the protrusion 311 to pass through, and the elastic member 1213 then returns to its original position to snap the protrusion 311, forming a snap-fit connection.

According to another preferred embodiment of the present invention, the snap-fit portion 120 according to the present invention further comprises a snap joint 122.

Referring to FIGS. 4 to 8, according to an embodiment of the present invention, the snap-fit portion 120 of the optical structure comprises a slot 121 and a snap joint 122. The matching portion 310 is provided with a protrusion 311 matching the slot 121, and an extension 312 matching the snap joint 122. The slot 121 is used to accommodate the protrusion 311. The snap joint 122 is used to retain the extension 312.

The snap joint 122 retains the extension 312 and cooperates with the connection structure of the slot 121 and the protrusion 311, such that the connection between the light shielding structure 100 and the supporting portion is more stable.

More preferably, the snap-fit portion 120 comprises two slots 121 and two snap joints 122, and the matching portion 310 comprises two protrusions 311 and two extensions 312.

The two slots 121 are close to an end of the covering portion 110.

Preferably, the two protrusions 311 are located on two sides of the accommodation portion 320 of the supporting portion 300, and the two extensions 312 are located on two sides of an end of the accommodation portion 320.

According to yet another preferred embodiment of the present invention, the light shielding component 100 further comprises at least one contact portion 123 for making contact with the light guide 200.

The contact portion 123 protrudes from a plane of the snap-fit portion 120 in a direction of the light guide 200, to press the light guide 200 against the supporting portion 300. In this way, the connection between the light shielding structure 100, the light guide 200 and the supporting portion 300 is more tight and stable.

A person skilled in the art should understand that, according to the solutions of the present invention, by using a light shielding component, light beam leakage is better blocked, and a better visual effect is achieved. In addition, the structure in which the light shielding component is directly connected to the supporting portion can make the overall structure more stable and reliable.

To a person skilled in the art, it would be obvious that the present invention is not limited to the details of the demonstrative embodiments above, and could be implemented in other specific forms without deviating from the spirit or fundamental features of the present invention. Thus, regardless of which viewpoint is taken, the embodiments should be regarded as being demonstrative and non-limiting; the scope of the present invention is defined by the attached claims and not by the explanation above, hence it is intended that all changes falling within the meaning and scope of equivalent key elements of the claims are included in the present invention. No reference signs in the claims should be regarded as limiting the claims concerned. In addition, it is obvious that the word "comprises" does not exclude other units or steps, and the singular does not exclude the plural. Multiple units or apparatuses presented in system claims may also be realized by one unit or apparatus by means of software or hardware. Words such as first and second are used to indicate designations, and do not indicate any specific order.

What is claimed is:

1. A light shielding component, comprising:

a covering portion and a snap-fit portion, wherein the covering portion extends for a length from an end of a light guide and is used to cover the light guide to completely block the transmission of light rays over the length;

the snap-fit portion includes a slot and a snap joint;

a supporting portion with a protrusion adapted to match the slot where the slot is configured to accommodate the protrusion; and an end of an extension is adapted to match the snap joint where the snap joint is configured to retain the extension; and the snap-fit portion is configured to fix the light shielding component to the light guide.

2. The light shielding component according to claim 1, wherein the snap-fit portion is located on two sides of the covering portion.

3. The light shielding component according to claim 1, wherein the snap-fit portion includes a number of slots.

4. The light shielding component according to claim 1, wherein the snap-fit portion further includes a snap joint.

5. The light shielding component according to claim 1, wherein the snap-fit portion includes two slots and two snap joints, wherein the two snap joints are along an end of the covering portion.

6. An optical assembly, comprising:

a light shielding component, with the light shielding component including a covering portion and a snap-fit portion;

a light guide, with the covering portion extending for a length from an end of the light guide that is configured to cover the light guide to completely block a transmission of light rays over the length;

a supporting portion, wherein the supporting portion is provided with a matching portion corresponding to a snap-fit portion of the light shielding component, where the snap-fit portion includes a slot and a snap joint; and the matching portion is provided with an extension matching the snap joint, where the snap joint is adapted to retain the extension.

7. The optical assembly according to claim 6, wherein the matching portion is provided with a protrusion matching the slot, where the slot is adapted to accommodate the protrusion.

8. The optical assembly according to claim 6, wherein the matching portion includes two protrusions and two extensions;

the two protrusions are located on two sides of an end of an accommodation portion of the supporting portion; and the two extensions are located on two sides of the accommodation portion.

9. The optical assembly according to claim 6, wherein the supporting portion includes an accommodation portion for accommodating the light guide.

10. The optical assembly according to claim 9, wherein a main body of the light guide is in the shape of a long strip;

the accommodation portion is an arc-shaped groove, and the covering portion includes an arc-shaped groove matching the light guide in shape.

11. The optical assembly according to claim 6, wherein the optical assembly further includes a light source.

12. A vehicle lamp comprising:

a light shielding component including a covering portion and a snap fit portion, wherein the covering portion extends for a length from an end of a light guide and is used to cover the light guide to completely block the transmission of light rays over the length and the snap-fit portion is used to fix the light shielding component to a supporting portion;

a light source;

the light guide;

the snap-fit portion includes a slot and a snap joint;

the supporting portion with a protrusion adapted to match the slot where the slot is configured to accommodate the protrusion; and an end of an extension is adapted to match the snap joint where the snap joint is configured to retain the extension of the light shielding component.

* * * * *